United States Patent
Heim et al.

[11] Patent Number: 5,987,821
[45] Date of Patent: Nov. 23, 1999

[54] MOTOR VEHICLE DOOR

[75] Inventors: Gunther Heim, Rodgau; Stephan Schütt, Rüsselsheim; Jürgen Hock, Aschaffenburg; Thomas Scherbaum, Forchheim, all of Germany

[73] Assignee: Wagon Automotive GmbH, Waldaschaff, Germany

[21] Appl. No.: 08/937,770

[22] Filed: Sep. 25, 1997

[30] Foreign Application Priority Data

Sep. 25, 1996 [DE] Germany .................. 196 39 280

[51] Int. Cl.$^6$ .................................................. B60J 5/04
[52] U.S. Cl. .................................. 49/502; 296/146.5
[58] Field of Search .................. 296/146.5, 146.6, 296/146.7, 146.9; 49/502, 501

[56] References Cited

U.S. PATENT DOCUMENTS

| | | | |
|---|---|---|---|
| 4,151,683 | 5/1979 | Narita et al. | 49/502 |
| 4,744,173 | 5/1988 | Mesnel et al. | 49/502 X |
| 5,050,351 | 9/1991 | Goldbach et al. | |
| 5,275,455 | 1/1994 | Harney et al. | 296/146.5 X |
| 5,398,453 | 3/1995 | Heim et al. | 49/502 |
| 5,446,999 | 9/1995 | Inaba et al. | 49/502 |
| 5,855,094 | 1/1999 | Baudisch et al. | 49/502 |

FOREIGN PATENT DOCUMENTS

| | | |
|---|---|---|
| 0 434 552 B1 | 2/1993 | European Pat. Off. |
| 0 424 760 A2 | 5/1991 | Germany. |
| 690 00 874 T2 | 6/1993 | Germany. |
| 0 434 552 | 2/1993 | United Kingdom. |

*Primary Examiner*—D. Glenn Dayoan
*Assistant Examiner*—Chad D. Wells
*Attorney, Agent, or Firm*—Venable; Norman N. Kunitz

[57] ABSTRACT

A motor vehicle door having a door frame (2; 2') and a covering (3; 3'; 3"; 36) attached to the outer side of the door frame. To accomplish that the outer covering (3; 3'; 3"; 36) of the vehicle door can be mounted on the door frame (2, 2') easily, quickly and economically and that it can be replaced in a simple manner, the covering (3; 3'; 3"; 36) is positioned on the door frame via a horizontal sliding movement. For this purpose, the door frame (2, 2') is respectively provided with a respective horizontal guide rail (9, 13) on its side facing the top and bottom edge region (6, 11; 11') of the covering (3; 3'; 3"; 36) into which guide rail the bent-back portions (8, 12) of the corresponding U-shaped edge regions (6, 11) of the covering (3; 3'; 3"; 36) are engaged.

12 Claims, 6 Drawing Sheets

5,987,821

MOTOR VEHICLE DOOR

REFERENCE TO RELATED APPLICATIONS

This application claims the priority of German application No. DE 196 39 280.2, filed Sep. 25, 1996, which is incorporated herein by reference.

BACKGROUND OF THE INVENTION

The invention relates to a motor vehicle door having a door frame and a covering attached to the outer side of the door frame.

A motor vehicle door of this type is disclosed, for example, in German patent document No. DE 690 00 874 T2. In order to fasten the outer covering (outer skin) to the outer frame of the door, the outer covering is first positioned through a vertical displacement from the bottom to the top and a subsequent horizontal displacement from the back to the front, and then it is fastened by means of clamping and locking devices. During the displacement in the horizontal direction, clamps which are arranged on the top edge and on the front edge of the covering, and which are oriented forward, are inserted into and engaged in corresponding openings of the door frame.

The disadvantage of this known vehicle door is, inter alia, that recesses for the engagement of the clamps of the covering must be provided in the door frame, causing additional costs. It is also relatively easy for rainwater to enter the door from the top edge of the covering.

It therefore is the object of the invention to provide a motor vehicle door whose outer covering can be mounted easily, quickly and economically and which can be replaced in a simple manner.

SUMMARY OF THE INVENTION

The above object generally is achieved according to the present invention by a motor vehicle door having a door frame and a door covering attachable to the outer side of the door frame, and wherein: the top and bottom edge regions of the covering are each configured as an inwardly directed edge fold with horizontally extending bent back portions; the door frame is provided with respective horizontally extending guide rails on its side facing the top and bottom edge regions of the covering, with these guide rails engaging the respective bent-back portions of the edge regions of the covering such that, for assembly, the bent-back portions of the covering can be inserted laterally into the guide rails and can be displaced laterally to a fixing or desired position along the guide rails; a rear region of the covering is configured as an inwardly directed edge fold with a vertically extending bent-back portion which is connected with the door frame; and, a front region of the covering is clipped to the door frame either directly or via an adapter element secured to the door frame. Further, particularly advantageous features of the invention additionally are disclosed.

The invention is substantially based on the concept of positioning the outer covering merely through a horizontal sliding movement. For this purpose, according to the preferred embodiment of the invention, the door frame is provided with a guide rail on each of its sides facing the top and bottom edge regions of the covering; the bent-back portions of the corresponding edge regions of the covering, which each are configured in the shape of an edge fold, engage in the guide rails. The sliding-in process is complete when the rear region of the covering, also configured as an edge fold, abuts against a corresponding stop edge of the door frame.

Once the covering has been positioned on the door frame, the front edge of the covering is connected to the door frame. This can take place, for example, via a direct detent connection. However, an adapter element may also be provided with the adapter being connected, on the one hand, with the door frame and, on the other hand, for example, with the covering via a clip strip.

BRIEF DESCRIPTION OF THE DRAWINGS

Further details and advantages of the invention can be taken from the embodiments below which are explained by way of the drawing figures wherein.

DETAILED DESCRIPTION OF THE PREFERRED EMBODIMENTS

Figure 1:
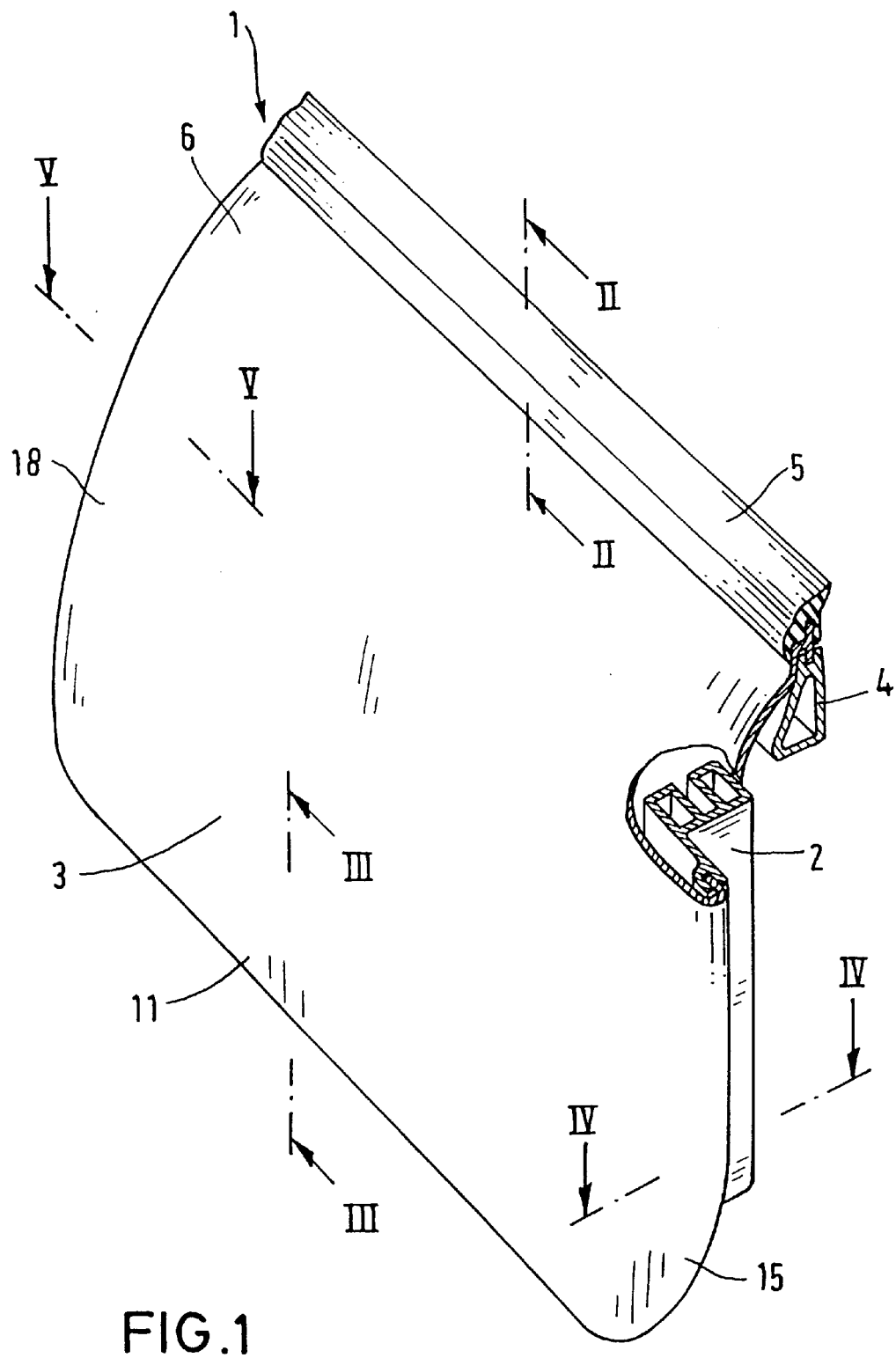
FIG. 1 is a perspective view of the outer part of a vehicle door according to the invention.

In FIG. 1, 1 identifies the outer part of a motor vehicle door, essentially comprising a circumferential door frame 2, shown only partially, e. g., a profiled aluminum section, and an outer covering 3, preferably made from plastic. Furthermore, 4 identifies a profiled window shaft section of the door frame 2, and 5 identifies a rubber seal for a window pane which is not shown in this figure for the sake of clarity.

Figure 2:
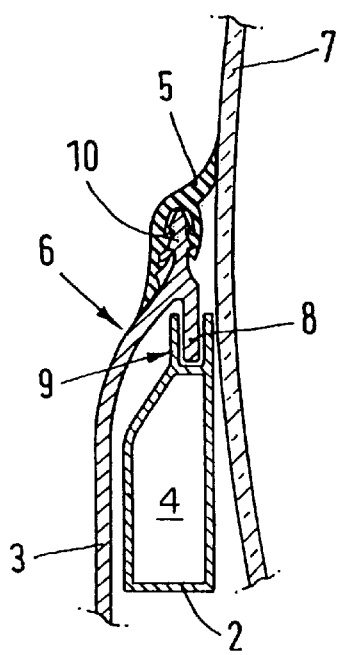
FIGS. 2–5 are sections through the door part illustrated in FIG. 1 along the cut lines indicated in FIG. 1 by reference numerals II—II to V—V, respectively.

FIG. 2 illustrates a cross section through the top edge region 6 of the covering 3. Here, reference numeral 7 indicates a window pane. The top edge region 6 of the covering 3 is configured as an inwardly directed edge fold with the actual edge extending substantially horizontally. The bent-back portion 8 of the edge fold 6 engages in a horizontally extending, upwardly open U-shaped (in cross-section) guide rail 9 of the door frame 2, in particular on the profiled window shaft section 4 with the guide rail being open at least at its rear end. Furthermore, the covering 3 is provided with an upwardly extending corrugated strip 10 in its upper end region over which the covering 3 is clamped with the rubber seal 5.

Figure 3:
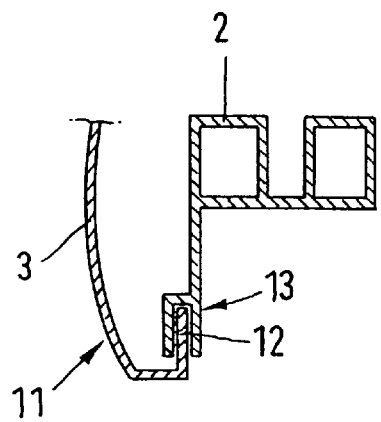

Like the top edge region 6, the bottom edge region 11 of the covering 3 is also designed as an inwardly directed edge fold will be actual edge portion 12 extending substantially horizontally (FIG. 3). The bent-back edge portion 12 of the edge fold 11 also engages in a horizontally extending, U-shaped, in cross-section, guide rail 13, which in this case is open downwardly, of the door frame 2.

For the mounting of the vehicle door, the bent-back portions 8 and 12 of the covering 3 are inserted into the guide rails 9 and 13, respectively, on the same door side, and the covering 3 is then displaced horizontally until a corresponding stop 14 (FIG. 4) of the rear region of the covering 3, also designed as an inwardly directed edge fold 15, abuts against the door frame 2. In the illustrated embodiment, the stop 14 is formed by the bottom of the groove of a rail 16 having a U-shaped generally vertically extending cross section. The bent-back portion 17 of the rear edge fold 15 of covering 3 is arranged so as to be insertable into the rail 16 when the covering 3 is in its proper position.

Figure 5:
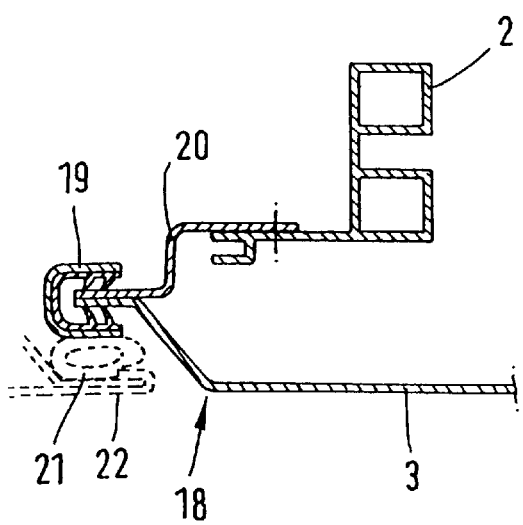

Finally, the covering 3 is clipped in its front region 18 to an adapter element 20 via a clip strip 19 (FIG. 5), with the adapter element 20 being connected to the door frame 2. Here, the clip strip 19 is designed such that it pushes against the seal 21 of the front fender 22 and thus, via the seal 21, prevents the door joint from getting soiled in this region. This arrangement also has a noise-damping effect which, e. g., minimizes thumping noises of the tires.

Figure 6:
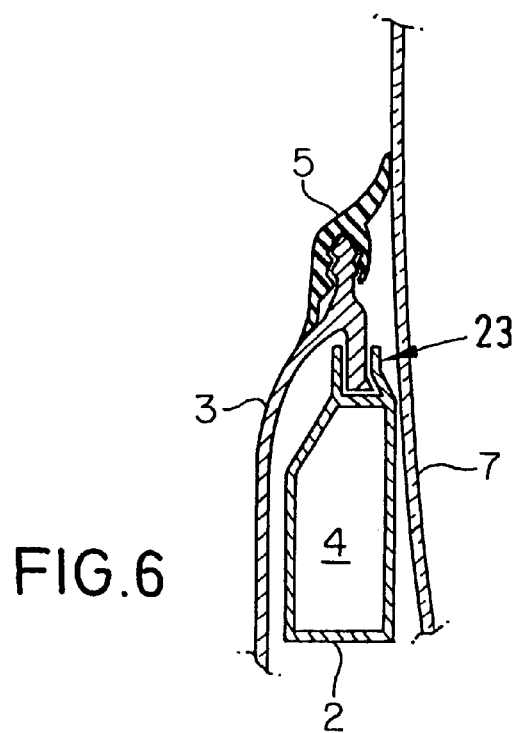
FIG. 6 is a section through a further embodiment of a vehicle door according to the invention in the region of the top edge of the covering.

Of course, the invention is not limited to the preferred embodiment described above. For example, the folded-back portion of the top edge fold of the covering 3 and the associated guide rail or the frame can also be designed as a (one-sided or double-sided) dovetail shaped guide 23 as shown in FIG. 6 instead of as the flat or U-shaped guide of FIG. 2.

Figure 4:
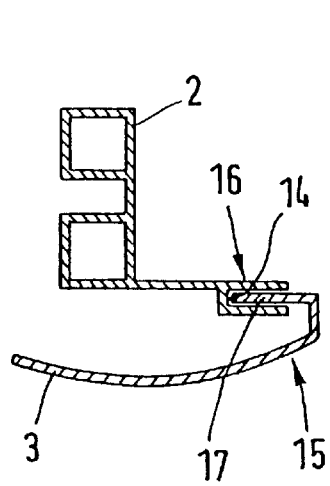
Figure 7:
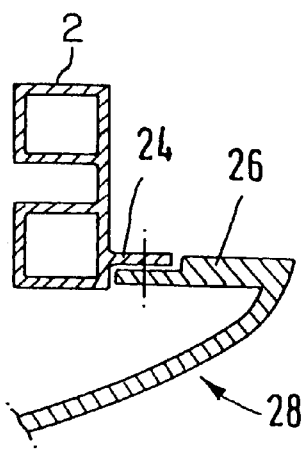
FIGS. 7 and 8 are two sections through vehicle doors according to the invention, each in the region of the rear edge of the covering.
Figure 8:
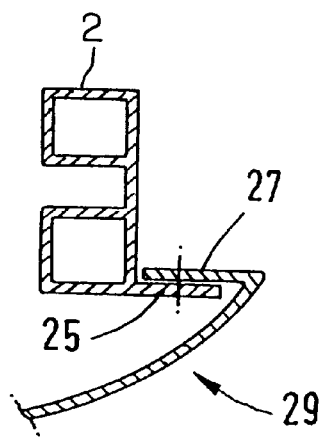

A stop bar 24 (FIG. 7) or 25 (FIG. 8) can also be used as a stop for the rear region of the covering 3 instead of the guide rail arrangement of FIG. 4. The bent-back portion 26 or 27 of a rear edge fold 28 or 29, respectively of FIGS. 7 and 8 is then fastened to the stop bar 24 of 25 in a conventional manner, e.g., by a screw.

Figure 9:
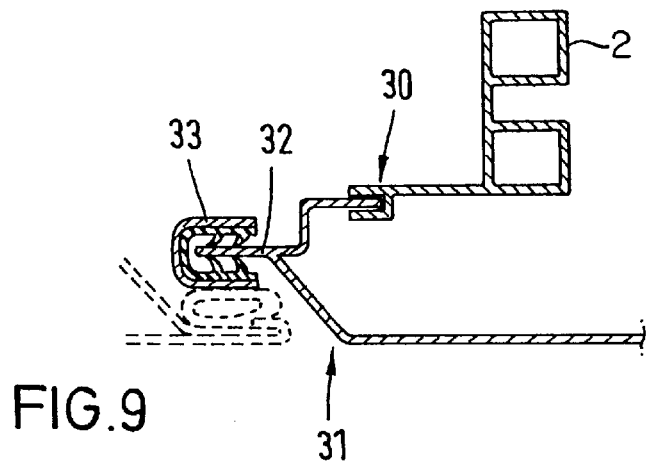
FIGS. 9 and 10 are two sections through vehicle doors according to the invention, each in the region of the front edge of the covering.

Furthermore, the front region of the covering 3 can also be designed as an edge fold and the bent-back portion of the edge fold can be seated in a U-shaped rail 30 which extends generally vertically and opens forwardly, and which is arranged on the door frame (FIG. 9). In this configuration, the front edge fold 31 can have a front web-shaped or rib-shaped extension 32 on which, in turn, a clip strip 33 is arranged to prevent soiling in cooperation with the seal of the vehicle A column.

Figure 10:
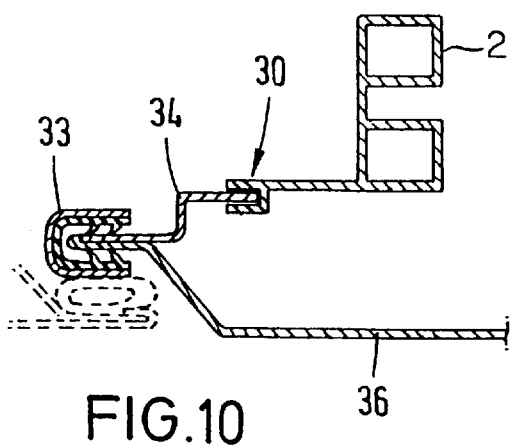
Figure 11:
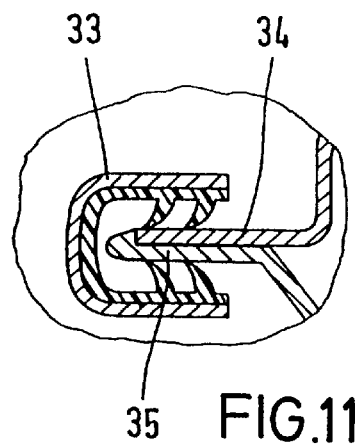
FIG. 11 is an enlarged cross section of the clip strip identified by numeral 33 in FIG. 10.

Even when an adapter element 34, as shown in FIG. 10, is used between the door frame 2 and the covering 3, the end of the adapter element 34 facing the housing section can also be seated in the U-shaped rail 30 that is arranged on the door frame 2. The corresponding arrangement of the adapter element 34 and of the front region 35 of a corresponding door covering 36 in the clip strip 33 is shown in FIG. 11.

Figure 12:
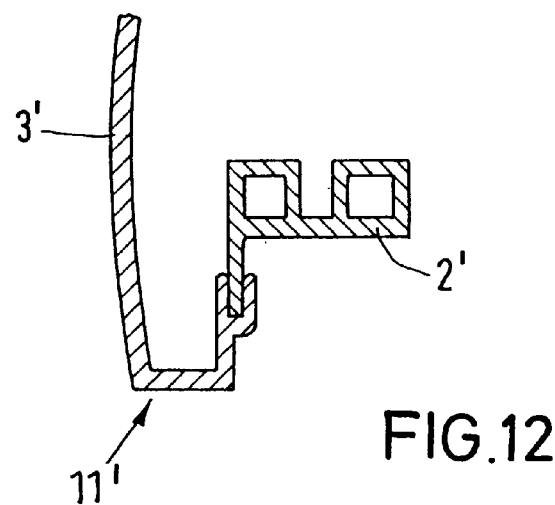
FIG. 12 is a section corresponding to FIG. 3 through a further embodiment of a vehicle door: and, FIGS. 13–15 are three enlarged perspective views of door frames in the region of the rear edge of the covering of vehicle doors according to the invention.

Different from what is shown in FIG. 3, the end of the edge fold 11' of the covering 3' in the bottom region of the vehicle door can also be U-shaped and the corresponding guide rail on the door 2 can be web-shaped or rib-shaped as shown in FIG. 12.

And finally, it turned out to be especially advantageous to arrange profiled packing between the ends of the edge folds and the U-shaped frame elements or guide receiving the ends of the edge folds of the covering 3. In case of a lateral collision, the profiled packings absorb at least a portion of the deformation energy, so that minor "altercations" do not result in any sizable damage to the respective vehicle door.

Figure 13:
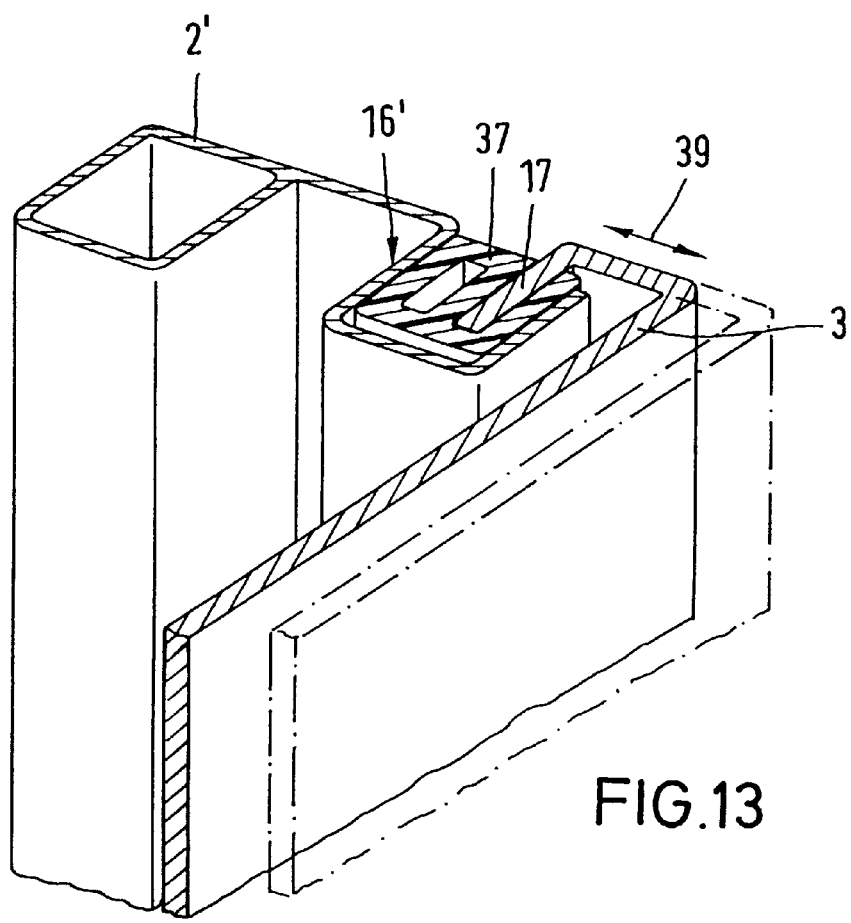
Figure 14:
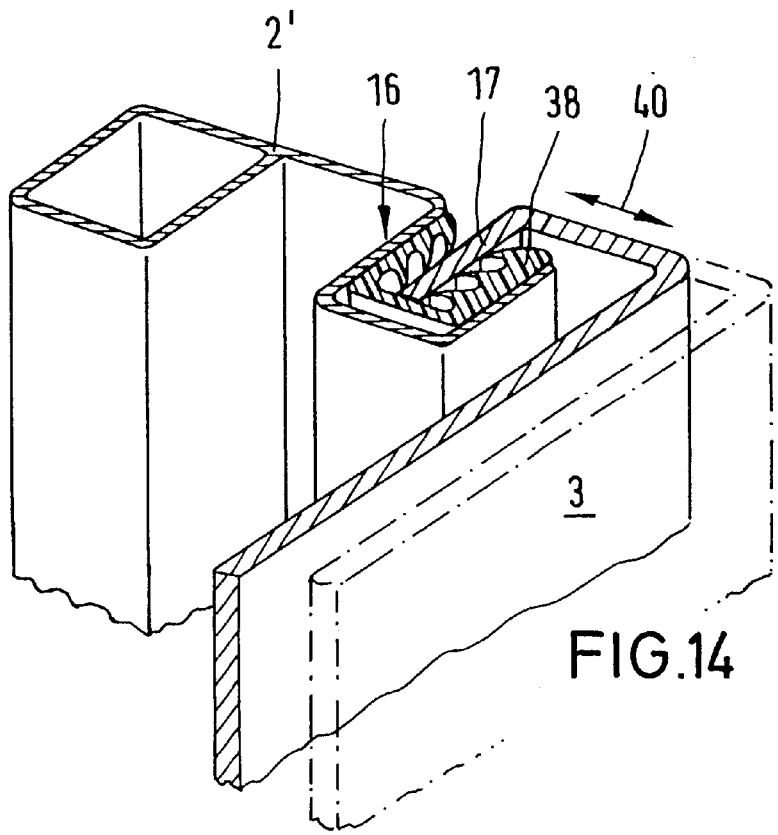

Corresponding embodiments of such profiled packing arrangements are shown in FIGS. 13 and 14. Both of these figures show a detail of the rear edge of the covering 3. The profiled packings which are arranged in the rails 16' or 16 are identified by numerals 37 and 38, respectively. The profiled packings 37, 38 can be resiliently compressed in the direction of the arrows 39, 40.

Figure 15:
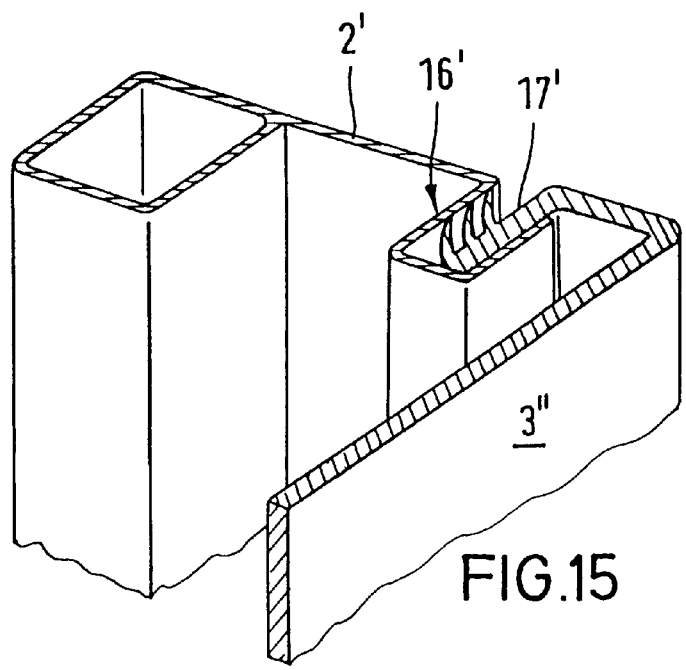

FIG. 15 illustrates a detail corresponding to FIGS. 13 and 14, but the bent-back portion 17' of the covering 3" itself has a lamellar shape and forms a non-positive and frictionally locked connection with the door frame 2". It is of course understood that although the packings are shown for the rear edge of the cover 3, packings can be used between any of edge folds and the associated guides.

The invention now being fully described, it will be apparent to one of ordinary skill in the art that any changes and modifications can be made thereto without departing from the spirit or scope of the invention as set forth herein.

What is claimed:

1. A motor vehicle door having a door frame and a door covering attachable to an outer side of the door frame, and wherein:

top and bottom edge regions of the covering are each configured as an inwardly directed edge fold with horizontally extending bent back portions;

the door frame is provided with respective horizontally extending guide rails facing the top and bottom edge regions of the covering, with these guide rails engaging the respective bent-back portions of the edge regions of the covering such that, for assembly, the bent-back portions of the covering can be inserted horizontally into the guide rails and can be displaced horizontally to a fixing position along the guide rails;

a rear region of the covering is configured as an inwardly directed edge fold with a vertically extending bent-back portion which is connected with the door frame; and, a front region of the covering is clipped to the door frame either by one of directly and via an adapter element secured to the door frame.

2. A motor vehicle door according to claim 1, wherein: the door frame is provided with a vertically extending rail having a U-shaped cross section adjacent the rear region of the covering, and the bent-back portion of the rear edge fold is inserted into the rail to fasten the bent-back portion of the rear edge fold to the door frame.

3. A motor vehicle door according to claim 1, wherein: the door frame has a vertically extending rib-shaped stop bar adjacent the rear region of the covering; and the bent-back portion of the rear edge fold is fastened in a form-fitting manner to the rib-shaped stopper.

4. A motor vehicle door according to claim 1 wherein the covering has a corrugated strip mounted thereon in the region of the top edge fold for receiving a rubber seal.

5. A motor vehicle door according to claim 1 wherein the top guide rail of the door frame and the bent-back portion of the associated top edge fold of the covering form a dovetail guide.

6. A motor vehicle door according to claim 1 wherein the top guide rail has a u-shaped cross section which is open in an upward direction.

7. A motor vehicle door according to claim 1, wherein: the door frame is provided with a vertically extending rail having a U-shaped cross section adjacent the front region of the covering, with the vertical extending rail being open in a forward direction; and, the front region of the covering is configured as an inwardly directed edge fold having a bent-back portion which extends into the front vertically extending rail of the frame.

8. A motor vehicle door according to claim 1, wherein: the door frame is provided with a vertically extending rail having a U-shaped cross section adjacent the front region of the covering, with the vertical extending rail being open in a forward direction; and, the front region of the covering is connected to the adapter element which extends rearwardly into the front vertically extending rail of the door frame.

9. A motor vehicle door according to claims 8, wherein the adapter element and the front region of the covering are connected with one another by a clip strip.

10. A motor vehicle door according to claim 7 wherein the front region of the covering is provided with a forward extending rib-shaped extension which extends into a clip-strip.

11. A motor vehicle door according to claim 1 wherein profiled packings are arranged between the ends of the respective edge folds of the covering and walls of the associated rails of the door frame in which the ends are received.

12. A motor vehicle door according to claims 1 wherein at least some of the bent-back portions of the covering have a lammellar shape and form a non-positive and frictionally locked connection with the associated rails of the door frame.

* * * * *